(12) United States Patent
Haggerty

(10) Patent No.: US 8,087,644 B2
(45) Date of Patent: Jan. 3, 2012

(54) SHAPED PACKING ELEMENT

(76) Inventor: Kenneth Haggerty, Willowdale (CA)

( * ) Notice: Subject to any disclaimer, the term of this patent is extended or adjusted under 35 U.S.C. 154(b) by 1014 days.

(21) Appl. No.: 12/010,484

(22) Filed: Jan. 25, 2008

(65) Prior Publication Data

US 2008/0179764 A1    Jul. 31, 2008

Related U.S. Application Data

(60) Provisional application No. 60/897,507, filed on Jan. 26, 2007.

(51) Int. Cl.
*B01F 3/04* (2006.01)

(52) U.S. Cl. ........................ 261/83; 261/94; 261/DIG. 72

(58) Field of Classification Search .................. 261/83, 261/94, 100, 112.2, 113, DIG. 72; 428/116
See application file for complete search history.

(56) References Cited

U.S. PATENT DOCUMENTS

| | | |
|---|---|---|
| 6,007,915 A | 12/1999 | Rukovena |
| 6,182,950 B1 * | 2/2001 | Fan ............................... 261/94 |
| 7,048,855 B2 | 5/2006 | de la Cruz |

* cited by examiner

*Primary Examiner* — Robert A Hopkins
(74) *Attorney, Agent, or Firm* — Gowling Lafleur Henderson LLP

(57) ABSTRACT

The present invention provides a packing element comprising at least one sheet having a plurality of deformations, the sheet being operable to form a folded or helical configuration wherein adjacent portions of the at least one sheet are spaced to allow for flow of at least one of fluid, air and gas therebetween.

25 Claims, 3 Drawing Sheets

SHAPED PACKING ELEMENT

CROSS-REFERENCE TO RELATED APPLICATION

The present application claims the benefit under 35 U.S.C. §119(e) of provisional patent application Ser. No. 60/897,507, filed Jan. 26, 2007, the contents of which are hereby incorporated by reference.

FIELD OF THE INVENTION

The invention relates to a shaped packing element and more particularly to a packing element having a folded or helical configuration.

BACKGROUND OF THE INVENTION

Packing elements or devices having relatively large surface areas in small volumes are employed in many industrial devices of which packed columns, and cooling towers are examples. In the case of packed towers a large variety of packing shapes have been developed using materials such as stainless steel, plastics, and ceramics. These variations purport to optimize the relevant process, in which they are to be used, by maximizing surface area which facilitates contact and transfer between a liquid and a gas with minimal head loss, maximal liquid flow and retained dimensional stability. U.S. Pat. No. 6,007,915 describes one example of such a shaped packing element.

The present invention provides an alternative packing element that includes a large exposed surface area in a relatively small volume and a method of obtaining the same. This feature is useful in facilitating a number of physical and or chemical processes and reactions where contacting between surfaces covered with different fluids or materials is desired.

SUMMARY OF THE INVENTION

In one aspect, the present invention provides a packing element comprising at least one sheet having a plurality of deformations thereon. The sheet is operable to form a folded configuration wherein adjacent portions of the at least one sheet are spaced to allow for flow of at least one of fluid, air and gas therebetween. The plurality of deformations are positioned and/or shaped to prevent nesting of the sheet when it is in the folded configuration.

In another aspect, the at least one sheet is formed of a material (e.g. substantially flat) operable for being manipulated to form the deformations. In an alternative aspect, the deformations are bonded or physically attached to the sheet.

In another aspect, the at least one sheet further comprises a supporting layer and a hollow semi-permeable membrane, the hollow semi-permeable membrane is sealed at each end and side portion to define a closed channel therein, the hollow semi-permeable membrane is operable to retain fluids such as reactant fluids within said closed channel for reacting with fluids and/or gases transferred through the semi-permeable membrane.

In another aspect, the hollow semi-permeable membrane is coupled to the supporting layer. In another aspect, the supporting layer is integrally formed with the semi-permeable membrane.

In another aspect, the deformations are formed on the hollow semi-permeable membrane such as to prevent nesting when formed in a helical or folded configuration.

In another aspect, the at least one sheet comprises two semi-permeable membranes separated by a spacer member and sealed at opposing ends and sides such as to form a closed channel therebetween, the two semi-permeable membranes are operable to retain fluids such as reactant fluids within said closed channel. In a further aspect, the deformations are formed on at least one of the two semi-permeable membranes.

In another aspect the present invention provides a method of fabricating a packing element comprising the steps of (i) providing at least one sheet comprising a plurality of deformations thereon; and (ii) folding the sheet to form a folded configuration or winding the sheet about a central axis to form a helix. The axis of winding may either be perpendicular to the central axis or at an angle to it depending on the shape of the media pack desired. The method further comprises the step of forming within at least one sheet a plurality of deformations, the deformations being at least one of spaced and shaped to be operable to prevent nesting of the at least one sheet when the sheet is wound into a helix. In a further aspect, the at least one sheet comprises one of a unitary sheet, a supporting layer having a hollow semi-permeable membrane coupled thereto or integrally formed therewith, the hollow semi-permeable membrane sealed at each end and side portion to define a closed channel therein, the hollow semi-permeable membrane operable to retain fluids such as reactant fluids within said closed channel. The reactant fluid retained within the semi-permeable membrane for reacting with fluids and/or gases transferred through the semi-permeable membrane.

In another aspect, the deformations are formed on the hollow semi-permeable membrane such as to prevent nesting when formed in a helical or folded configuration.

In another aspect, the at least one sheet comprises two semi-permeable membranes separated by a spacer member and sealed at opposing ends such as to form a closed channel therebetween, the two semi-permeable membranes operable to retain fluids such as reactant fluids within said closed channel. In a further aspect, the deformations are formed on at least one of the two semi-permeable membranes.

In an alternative aspect the present invention provides a mass transfer device comprising a series of packing elements, each packing element comprising at least one sheet comprising a plurality of deformations thereon, the sheet being operable to form a folded configuration wherein adjacent portions of the at least one sheet are spaced to allow for flow of at least one of fluid and air or gas therebetween. The mass transfer device may also include a central pipe for receiving the series of packing elements thereupon. Each of the packing elements being formed as described herein.

In another aspect, the at least one sheet comprises a supporting layer and a hollow semi-permeable membrane coupled thereto or integrally formed therewith, the hollow semi-permeable membrane is sealed at each end and side portion to define a closed channel therein, the hollow semi-permeable membrane operable to retain fluids such as reactant fluids. The reactant fluid within said closed channel operable to reacting with fluids and/or gases transferred through the semi-permeable membrane. In a further aspect, the hollow semi-permeable membrane is separated from the semi-permeable membrane via a spacer member.

In another aspect, the at least one sheet comprises two semi-permeable membranes separated by a spacer member and sealed at each end and sides to contain a fluid. The at least one sheet comprises deformations formed thereon and operable to form a folded configuration wherein adjacent portion of the at least one sheet are spaced to allow for flow of at least one of fluid, air, and gas therebetween.

BRIEF DESCRIPTION OF THE DRAWINGS

The present invention will now be described in further detail with reference to the following figures.

DETAILED DESCRIPTION OF THE PREFERRED EMBODIMENTS

The present invention provides a packing element comprising at least one sheet having a plurality of deformations thereon, the sheet being operable to form a folded configuration wherein adjacent portions of the at least one sheet are spaced to allow for flow of at least one of fluid, air and gas therebetween. The deformations on the sheet are at least one of sized and or positioned so that the sheet does not include any nesting portions, i.e. that the portions of the sheet that overlap do not nest against or within each other. Examples of the folded configuration include, for example, square, rectangular and polygonal. In an alternative embodiment, the packing element comprises at least one sheet that forms a helical configuration, which will be discussed in further detail below. As will be described, according to one embodiment, the at least one sheet comprises one of: a unitary sheet (e.g. a substantially solid sheet, or a sheet having perforations); a supporting layer having a hollow semi-permeable membrane and sealed to retain fluids, two hollow semi-permeable membranes sealed to define a closed channel therebetween for retaining fluids such as reactant fluids. As will be further described, the semi-permeable membrane may be coupled to the supporting layer or integrally formed therewith.

One application of the present invention is directed to the construction of a high surface area media pack or packing element by the employment of surfaces wound around a central axis to form a helix which consequently contains a large surface area in a relatively small volume. It will be understood that a folded configuration may also be used in this application. It will be understood that the terminology "media pack" and "packing element" are used herein to refer to the same thing and therefore may be used interchangeably. Each packing element is formed from a large sheet which is overall substantially flat, but which includes deformations of a particular depth, and spacing, which vary in the direction perpendicular to the helix axis i.e. the direction of winding of the sheet. The depth of each deformation determines the spacing of overlapping portions of the sheet which forms the packing element, and the choice of repeat spacing of the varied shapes prevents the otherwise inevitable nesting which would result if the shapes were identical. Nesting would occlude the flow of liquid and air or gas at the contact area and would concurrently reduce the effectiveness of the contact surface.

Figure 1:
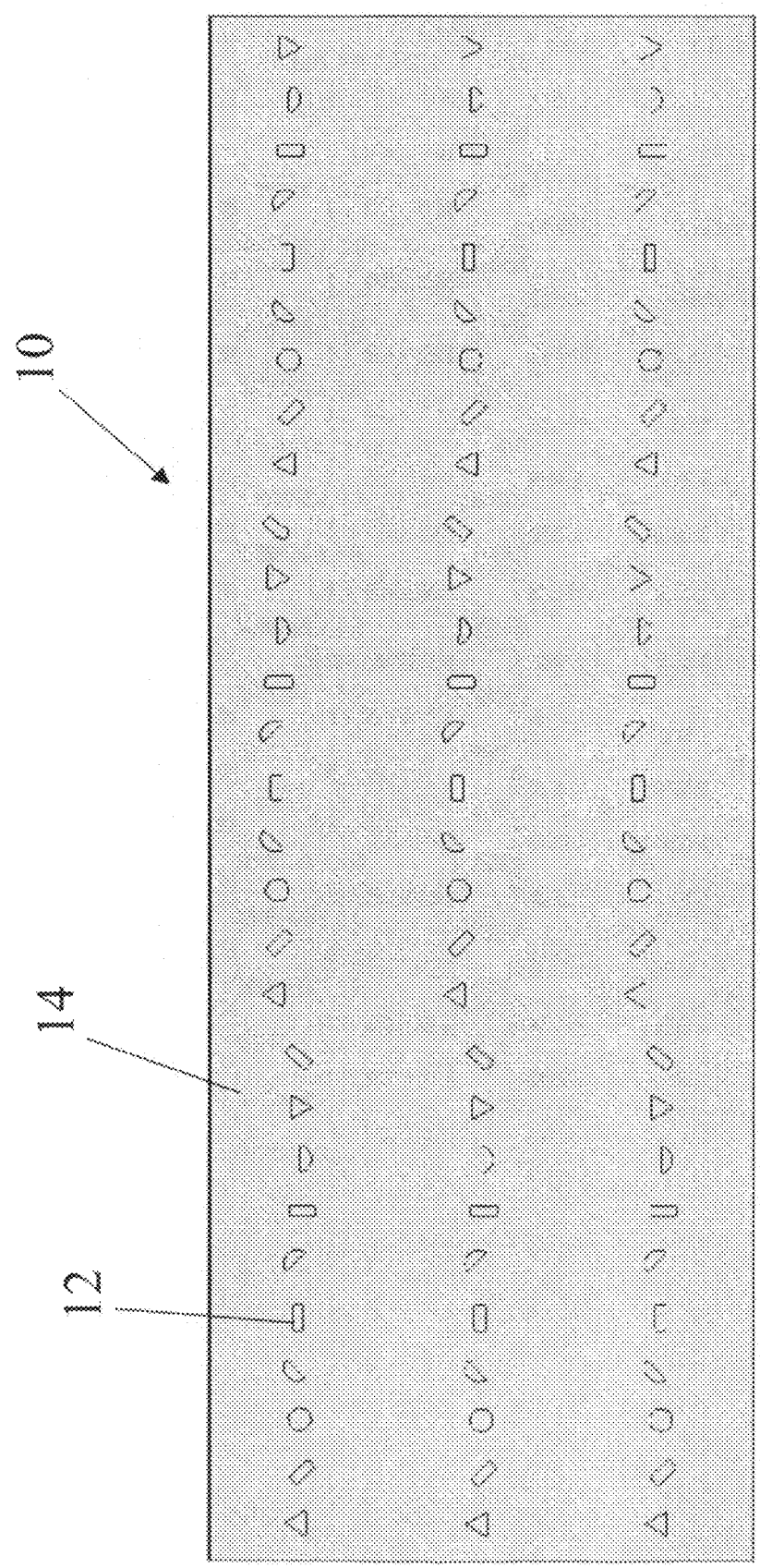
FIG. 1 is a plan view of one embodiment of a packing element of the present invention showing a sheet with a series of deformations

The protrusions located on the sheet may be chosen to be of varying shapes to prevent any subsequent nesting of the sheet in the helical formation or alternatively may be of the same shape but located at positions that will prevent any subsequent nesting. Alternatively the protrusions may include a combination of different shapes and positioning in order to prevent subsequent nesting of the wound sheet. Examples of some of the shapes that may be used are shown in FIG. 1. It will be understood that these examples are not meant to be limiting.

In one embodiment the packing element forms a helical configuration. The winding of the sheet to form a helix may occur around a central axis that is defined by one edge of the sheet. Alternatively the sheet may be wound about a central axis that is formed by a separate element such as a pipe or a tube. The sheet may be either wound in a plane perpendicular to the axis of the helix or the sheet may be wound in a helical fashion traversing the length of the pipe. Such helices may be co wound or alternately or intermittently counter rotationally wound depending on the manufacturing preferences.

In the embodiment in which the sheet forms a helix the plurality of deformations are preferably substantially perpendicular to the axis of the helix. In this embodiment, the helix may be formed by winding the at least one sheet around a central axis to form a cylinder having edges with a plane perpendicular to the central axis. Alternatively, the helix may be formed by winding the at least one sheet around a central axis such that the center of the sheet traverses the helix in directions both parallel and perpendicular to the central axis. In a further embodiment in which the packing element includes two or more sheets the helix may be formed by winding at least two sheets around a central axis such that the center of the sheets traverses a double helix rotating either concurrent or counter current to each other in directions both parallel and perpendicular to the central axis.

An alternative method of assembling the packing elements is to fold each sheet back and forth into a square or rectangular or other more or less polygonal configuration to form a more or less solid packing element or media pack. In this square, rectangular, or polygonal configuration the shape and/or positioning of the protrusions on the sheet prevent nesting of adjacent folded layers of the sheet.

In a further embodiment of the present invention the packing element, or a series of packing elements may be used in a mass transfer device.

Figure 2:
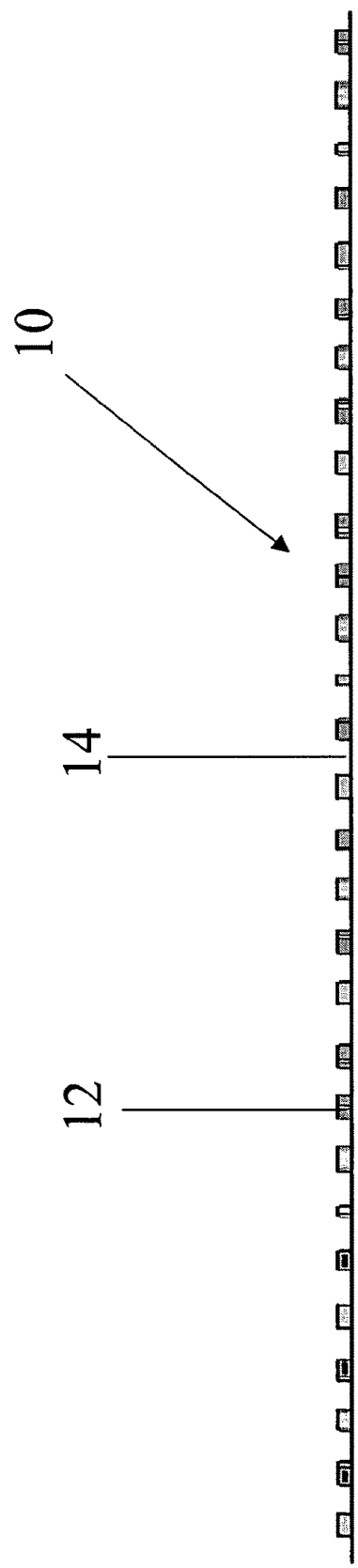
FIG. 2 is a side view of the sheet of FIG. 1.
Figure 3:
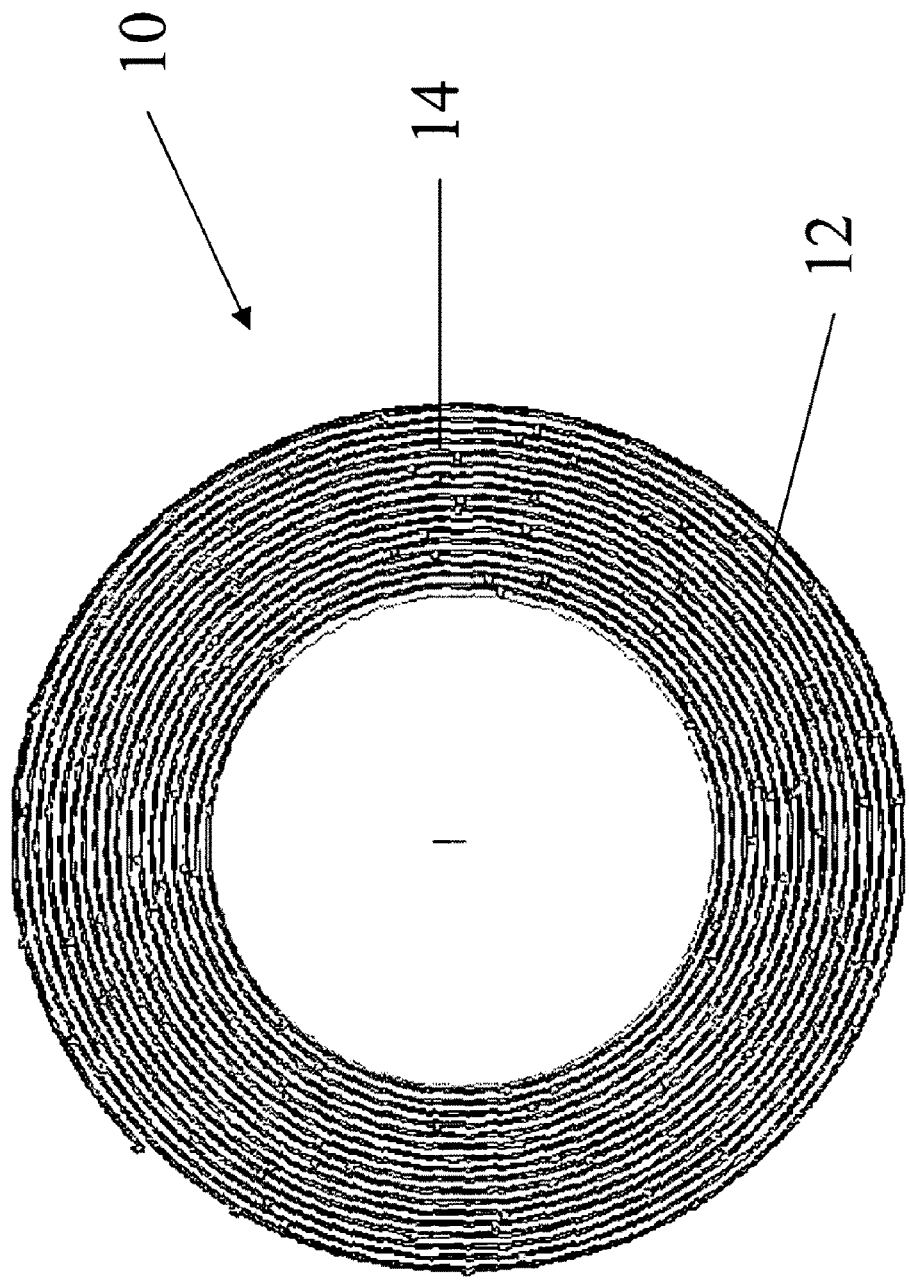
FIG. 3 is a side view of one embodiment of the packing element of the present invention in a wound helix configuration showing the non-nesting feature of one configuration of the deformations on a sheet.

FIG. 2 illustrates a side view of one embodiment of a packing element, indicated generally at numeral 10, having a series of protrusions 12 extending from one surface 14. A plan view of the packing element 10 is shown in FIG. 1. FIG. 3 illustrates the helical configuration of the packing element 10.

The transfer device, or reactor, to be created may be either a vertical tower, or a substantially horizontal rotating reactor, or alternatively an inclined reactor. The width of each sheet, and thus the packing element, may be the full length of the reactor to be created, or the packing elements may individually comprise a relatively small percentage of the longitudinal dimension of the helical axis of the reactor. Where the individual media pack elements do not comprise the full length of the helical axis they may be wound around or mounted on a central tube or pipe which serves as a connecting structure and which may also serve as a duct for transferring either the low density or the high density fluid from one end of the helix to the other end. Alternatively, the mass transfer device may include a plurality of packing elements that are positioned within the mass transfer device in series with each packing element being separately secured within the device.

In one embodiment the mass transfer device includes a series of packing elements, each packing element having at least one sheet comprising a plurality of deformations located on it and a central pipe upon which the series of packing element are located. The sheet is operable to form a helix wherein adjacent portions of the at least one wound sheet are spaced to allow for flow of at least one of fluid, air and gas therebetween. The sheets of the packing elements may be wound about the central pipe to form a helix or alternatively may be folded about the central pipe. It will be understood that the deformations located on the sheet function as per those described above, i.e. to prevent nesting of adjacent portions of the sheet whether in a helix or folded configuration. The mass transfer device may further include an external wrap that is located around the periphery of the series of packing elements to form an enclosure. The mass transfer device may also include a cylinder or other form of housing that is sized to receive the central pipe and the series of packing elements within it. It will be understood that the mass transfer device may not include a central pipe as described above.

In one embodiment, each said at least one sheet of each packing element refers to a sheet of unitary construction (e.g. a substantially solid sheet, a sheet having a woven construction, a sheet having one or more apertures) having a plurality of deformation formed thereon such as to prevent nesting.

According to another embodiment, the at least one sheet of each packing element comprises a supporting layer (e.g. a substantially solid impermeable supporting layer) having a hollow semi-permeable membrane (e.g. the hollow semi-permeable membrane is attached to, integrally formed on or embedded within at least a portion of the supporting layer). The hollow semi-permeable membrane is preferably sealed at each end and side portion to define a closed channel therein. The semi-permeable membrane is configured to receive and retain fluids such as a circulating reactant fluid within its interior (e.g. the closed channel). In one example, the at least one sheet comprises an impermeable layer supporting at least one hollow tubular semi-permeable membrane, where the circulating fluid is retained within the interior of the hollow tubular membrane. As described herein, the circulating reactant fluid may be used to react with a fluid and/or gas that transfers through the semi-permeable membrane. In another example, the at least one sheet comprises an impermeable supporting layer and a flat semi-permeable membrane attached, bonded or otherwise incorporated with the supporting layer. In this case, a spacer member may be used to provide a separation between the semi-permeable membrane and the supporting layer as will be understood by a person skilled in the art. As described herein, the semi-permeable membrane is operable to be manipulated into the deformations or the deformations are separately constructed and attached to the sheet.

Those skilled in the art, would understand a variety of semi-permeable material membranes may be used for forming the sheets having one or more semi-permeable membranes. Examples of semi-permeable membranes described herein forming at least a portion of each sheet are found in commercially available spiral wound cartridge membranes such as those manufactured and sold by Sterlitech. Examples of semi-permeable tubular membranes which may be used as part of the at least one sheet include commercially available semi-permeable membranes such as those manufactured and sold by Membrana, or Paterson Candy. Construction materials for the semi-permeable membranes include polypropylene, or other structurally sound non reactive materials as are in general use for construction of these semi-permeable membranes.

As will be understood by a person skilled in the art, semi-permeable membranes are fabricated with different sized openings depending on the molecules to be retained or excluded as needed. For example, for stripper scrubber membranes the pore opening sizes are generally between 0.02 and 5 microns.

An example application for using the packing element described herein comprising at least one semi-permeable membrane where a plurality of deformation are formed on the at least one sheet includes the recovery of certain fluids or gases from a fluid, air or gas flowing between adjacent portions of the at least one sheet as described herein. For example, one application includes the recovery of Ammonia from water or air present between adjacent portion of the at least one sheet of the packing element. In this example, an acidic fluid is retained and flows within the closed channel defined by the semi-permeable membrane and the outer surface of the semi-permeable membrane is in contact with the gas or liquid containing the Ammonia (either intermittently or continuously depending on the operating environment). The outer surface of the semi-permeable membrane is wetted and the Ammonia ions are drawn through the membrane pores by the concentration gradient existing across the semi-permeable membrane pores into the closed channel containing the acidic fluid. Accordingly, the reactant fluid is supplied into and withdrawn from the interior of the membrane assembly in order to ensure a supply of reactant to combine with the gas or liquid (such as Ammonia) that it is desirable to recover from the fluid or air outside the membrane prior to the solution (combined reactant fluid and Ammonia) becoming saturated.

Typically, known semi-permeable membranes (e.g. known arrangements of cartridge membranes) are likely to plug or otherwise be subjected to reduced flux.

Contrary to this, the semi-permeable membrane as used herein within a packing element provides several advantages and prevent plugging of the membranes. For example, in the embodiment where the media pack is rotating (e.g. the rotating mass transfer device), the rotation of the media pack ensures that the media pack is washed of any build up of fluids and or gases attached to the media pack. This prevents a build up of particulate materials. In addition, the speed of rotation can be varied to provide extra washing energy. Further, additional nozzles may be positioned to intermittently spray the media pack to reduce build up on the semi-permeable membrane.

According to the present embodiment, the deformation are formed on the hollow-semi-permeable membrane(s) such as to prevent nesting as described herein. As described earlier, said at least one sheet having a supporting layer and a semi-permeable membrane layer, is operable to form a helix wherein adjacent portion of the at least one sheet when in the helical formation are spaced to allow for flow of at least one of fluid, air and gas therebetween.

According to another embodiment, said at least one sheet comprises two semi-permeable membranes separated by a spacer member and sealed at each end such as to define a hollow closed channel therebetween. Spacer members as those known in the art may be used. The two semi-permeable membranes may be separated by a spacer element as will be understood by a person skilled in the art. The two semi-permeable membranes operable to receive and retain fluids (e.g. circulating reactant fluid) within the hollow closed channel. As will be understood, in the case of a reactant such as an acid retained within the closed channel to form an Ammonia salt, a stoichiometrically adequate supply of the reactant fluid and product removal is maintained.

In one embodiment the mass transfer device includes a series of packing elements, each packing element having at least one sheet. As described earlier, in one embodiment, the at least one sheet comprises one of: a unitary sheet; a supporting layer having a semi-permeable membrane attached thereto (and separated from the supporting layer via a spacer) such that the semi-permeable membrane is operable to retain fluids; or two semi-permeable membrane layers separated with a spacer element, the membranes sealed at opposing ends and each side to retain fluids. The at least one sheet comprises a plurality of deformations located on it (e.g. on the semi-permeable membrane(s)) and a central pipe upon which the series of packing element are located.

The mass transfer device may further include an external wrap that is located around the periphery of the series of packing elements to form an enclosure. The mass transfer device may also include a cylinder or other form of housing that is sized to receive the central pipe and the series of packing elements within it. It will be understood that, according to one embodiment, the mass transfer device does not include a central pipe as described above.

One example of an application for the present invention is a stripping column with gas introduced into the bottom of the column, and rising through the media to the top of the column whence it is transferred through the central pipe from the top of the column formed by the vertical helix to the bottom where it is connected to an adjacent reactor column for further treatment.

Another example of an application for the present invention is a scrubbing reactor in which the media comprises at least one sheet comprising one of: at least one supporting layer having a hollow semi-permeable membrane (e.g. via a spacer separating the membrane and the supporting layer), the hollow semi-permeable membrane containing a circulating fluid; or two semi-permeable membranes defining a hollow interior therebetween (separated by a spacer member) and configured to receive and retain reactant fluid within the interior. As described earlier, the hollow semi-permeable membrane is sealed at the sides and each end to retain the circulating reactant fluid. The gas containing the chemical to be scrubbed is introduced into the upstream end of the reactor, and passing through the media containing the hollow semi-permeable membrane surfaces to the downstream end of the reactor whence it is transferred to an adjacent reactor for further treatment, either through the central pipe from the downstream end of the reactor formed by the vertical helix to the bottom or by alternate piping means. It will be understood that the semi-permeable membrane(s) serves to contain a reactant that would otherwise mix, or react with undesirable effect with the gas being scrubbed.

Another embodiment of a horizontal or inclined contactor employs packing elements or media packs consisting of a scroll with open ends within which it is possible to create a small lip on each edge of the media so that the rotating pack will act as a pump, as described in co-pending PCT application No. PCT/CA2006/001498 in which a pump is described having sealed ends. When the center core is a closed pipe the pumped liquid can drain out into the downstream compartment. when configured properly this will improve process efficiencies. Where the compartment is adequately long the liquid pumped from the center will be adequately treated and only one compartment is required.

The present invention provides several advantages which include the following: (i) the flow of the low density fluid contains minimal interruptions and is much more laminar than is typical of presently available dumped or structured packing which results in a lower head loss and hence more economical operation, initial testing using air indicate head loss is ⅓ of that observed for 1" Tri-Pacs™ at the same superficial air velocity; (ii) the surface area per unit of volume which is obtained with this invention is slightly greater than that obtained from presently available packing materials; (iii) the cost of the materials is believed to be lower than that for conventional packing due to the less expensive materials and fabrication methods employed; and (iv) the surface may be incorporated into a horizontal device such as is the subject of a co-pending PCT application No. PCT/CA2006/001498 which in itself offers several advantages over conventional mass transfer devices.

It will be understood that the packing element of the present invention may include a sheet having deformations on one of the surfaces of the sheet or alternatively on both surfaces of the sheet. The location and amount of the protrusions to be included in the sheet will depend on the desired end use and the configuration and size of the packing element. For example, a larger sheet that is used in the packing element in a helical configuration may include more protrusions on the sheet in order to maintain a separation between adjacent overlapping portions of the sheet as the diameter of the wound helix increases. In a different configuration, the sheet may include more protrusions at one end of the sheet than the other, when in the unfolded/unwound configuration, in order that the protrusions are operable to function when in the wound configuration Examples of material that may be used for the packing elements including the supporting layer of the present invention includes sheets of polyvinyl chloride (PVC), sheets of polyethylene terephthalate (PET) and sheets of recycled polyethylene terephthlatate (RPET). Other examples of suitable material that may be used for the packing elements including the supporting layer include polyethelene and polypropylene. However, it will be understood that these examples are not meant to be limiting and other material such as stainless steel, or other metal with appropriate chemical resistance to surrounding fluids and/or gases, that is suitable for the application of the packing elements, and that is operable to be wound or folded as required by the invention, may be used. It will be understood that the sheet of the packing element may be formed of a solid sheet, an impermeable sheet, or a sheet having openings or perforations such as screens, woven constructions and other similar structures.

According to one embodiment, the material used in the packing elements is operable to be manipulated to include the required deformations. For example the sheet material may be deformable in a sheet stock configuration or alternatively the sheet may be extrudable into the desired deformed shapes as it is converted into a sheet. Preferably the material is relatively inert and chemically and dimensionally stable for the operating conditions required.

Alternatively, according to one embodiment, the deformations described herein are bonded or physically attached on the sheet after forming of a substantially flat sheet or the semi-permeable membrane(s). Preferably, the deformations are formed of a material that is relatively inert and chemically and dimensionally stable under the operating conditions required. For example thin stainless steel strips containing deformations as described herein may be mechanically attached to a PVC sheet to provide additional strength and dimensional stability when operating temperatures and stress would otherwise cause the PVC deformations to be subject to creep failure.

It is necessary that the media packs created from the deformed sheet be physically stable, and this may be ensured by bonding the adjacent sheets to each other. Such bonding may be achieved by physical connection, chemical bonding or otherwise fusing the sheets to each other at some or all of the contact points.

It will further be understood that the size and spacing of deformations is selected based on a variety of factors including the sheet stiffness characteristics, the volume of gas flowing (drag) and the propensity of deposits to form resulting from solids deposition from the liquid and solids formed from liquid gas interactions.

The present invention also provides a method of fabricating a packing element comprising the steps of (i) providing at least one sheet comprising a plurality of deformations thereon; and (ii) either winding the at least one sheet about a central axis to form a helix or folding the sheet to form a folded configuration. The method may include an initial step of forming at least one sheet with a plurality of deformations that are spaced and/or sized to prevent nesting of the at least one sheet when it is formed into a helix or folded configuration.

The present invention further provides a substantially horizontal rotating mass transfer device including at least one helical packing element (e.g. sealed semi-permeable membrane(s) containing circulating fluid), operable to rotate and comprising at least one sheet comprising a plurality of deformations thereon, the sheet being operable to form a helix wherein adjacent portions of the at least one wound sheet are spaced to allow for flow of at least one of fluid and gas therebetween, the helical packing element being operable to pump high density liquid upwards as the helical packing element rotates. The rotating mass transfer device may further include an enclosure located downstream from the at least one packing element, the high density fluid being operable to overflow the at least one packing element into the enclosure.

An alternative operational configuration to that described in paragraph 50 involves pumping the liquid to be treated to the center of the spiral sheet, or sealed semi-permeable membrane(s) containing circulating fluid, and distributing it into the innermost opening between the spiral sheet or. sealed semi-permeable membrane containing circulating fluid. By rotating the media pack in a direction counter to that which was used to wrap the sheet forming the helix the liquid will then be transferred to the exterior and discharged from the sheet.

While this invention has been described with reference to illustrative embodiments and examples, the description is not intended to be construed in a limiting sense. Thus, various modification of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

The invention claimed is:

1. A packing element comprising
at least one sheet comprising a plurality of deformations thereon, the sheet being operable to form a helix wherein adjacent portions of the at least one sheet when in the helical formation are spaced to allow for flow of at least one of fluid, air and gas or gases therebetween, wherein the plurality of deformations include deformations of varying shapes to prevent nesting of adjacent portions of the at least one sheet when formed in a helix.

2. The packing element of claim 1, wherein the deformations of varying shapes that are spaced from each other at a distance that prevents nesting of adjacent portions of the at least one sheet when formed in a helix.

3. The packing element of claim 1, wherein the plurality of deformations are substantially perpendicular to the axis of the helix.

4. The packing element of claim 1 wherein the helix is formed by winding the at least one sheet around a central axis to form a cylinder having edges with a plane perpendicular to the central axis.

5. The packing element of claim 1, wherein the helix is formed by winding the at least one sheet around a central axis such that the center of the sheet traverses the helix in directions both parallel and perpendicular to the central axis.

6. The packing element of claim 1 wherein the helix is formed by winding at least two sheets around a central axis such that the center of the sheets traverses a double helix rotating either concurrent or counter current to each other in directions both parallel and perpendicular to the central axis.

7. The packing element of claim 4 wherein the central axis is defined by one edge of the at least one sheet.

8. The packing element of claim 4, further comprising a pipe which defines the central axis around which the at least one sheet is wound to form the helix.

9. The packing element of claim 1, wherein the at least one sheet comprises: a supporting layer and a hollow semi-permeable membrane, the hollow semi-permeable membrane being sealed at each end and side portion to define a closed channel therein, the hollow semi-permeable membrane operable to retain fluids within said closed channel.

10. The packing element of claim 9, wherein the semi-permeable membrane is coupled to the supporting layer.

11. The packing element of claim 9, wherein the semi-permeable membrane is integrally formed with the supporting layer.

12. The packing element of claim 1, wherein the at least one sheet comprises: two semipermeable membranes separated by a spacer member and sealed at opposing ends and sides such as to form a closed channel therebetween, the two semi-permeable membranes operable to retain fluids within said closed channel.

13. The packing element of claims 9, wherein the deformations are formed on at least one semi-permeable membrane.

14. A mass transfer device comprising
a series of packing elements, each packing element comprising at least one sheet comprising a plurality of deformations thereon, the sheet being operable to form a helix wherein adjacent portions of the at least one wound sheet are spaced to allow for flow of at least one of fluid, air and gas therebetween; and
a central pipe for receiving the series of packing elements thereupon.

15. The mass transfer device of claim 14, wherein each of the sheets of each of the packing elements is wound about the central pipe to form a helix.

16. The mass transfer device of claim 14, wherein the plurality of deformations are spaced from each other at a distance that prevents nesting of adjacent portions of the at least one sheet when formed in a helix.

17. The mass transfer device of claim 14, wherein the plurality of deformations include deformations of varying shapes to prevent nesting of adjacent portions of the at least one sheet when formed in a helix.

18. The mass transfer device of claim 15, wherein the plurality of deformations include deformations of varying shapes that are spaced from each other at a distance that prevents nesting of adjacent portions of the at least one sheet when formed in a helix.

19. The mass transfer device of claim 14, further comprising a spiral wrap located around the exterior of the series of packing elements to form an enclosure.

20. The mass transfer device of claim 14, further comprising a cylinder sized to receive the central pipe and the series of packing elements therein.

21. The mass transfer device of claim 14, wherein the at least one sheet comprises one of: a supporting layer and a hollow semi-permeable membrane attached thereto, the hollow semi-permeable membrane being sealed at each end and side portion to define a closed channel therein, the hollow semi-permeable membrane operable to retain fluids within said closed channel; and two semi-permeable membranes separated by a spacer member and sealed at opposing ends and sides such as to form a closed channel therebetween, the two semi-permeable membranes operable to retain fluids within said closed channel.

22. A substantially horizontal rotating mass transfer device comprising at least one helical packing element operable to rotate and comprising at least one sheet comprising a plurality of deformations thereon, the sheet being operable to form a helix wherein adjacent portions of the at least one wound sheet are spaced to allow for flow of at least one of fluid and gas therebetween, the helical packing element being operable to pump high density liquid upwards as the helical packing element rotates.

23. The rotating mass transfer device of claim 22, further comprising an enclosure located downstream from the at least one packing element, the high density fluid being operable to overflow the at least one packing element into the enclosure.

24. The rotating mass transfer device of claim 22, wherein the at least one sheet comprises one of: a supporting layer and a hollow semi-permeable membrane attached thereto, the hollow semi-permeable membrane being sealed at each end and side portion to define a closed channel therein, the hollow semi-permeable membrane operable to retain fluids within said closed channel; and two semi-permeable membranes separated by a spacer member and sealed at opposing ends and sides such as to form a closed channel therebetween, the two semi-permeable membranes operable to retain fluids within said closed channel.

25. A rotating mass transfer device comprising at least one helical packing element operable to rotate and comprising at least one sheet comprising a plurality of deformations thereon, the sheet being operable to form a helix wherein adjacent portions of the at least one wound sheet are spaced to allow for flow of at least one of fluid and gas therebetween, the packing element being operable to transfer liquid from the center of the helix to the exterior thereof.

* * * * *